(12) United States Patent
Brückner et al.

(10) Patent No.: US 7,420,985 B2
(45) Date of Patent: Sep. 2, 2008

(54) METHOD FOR OPERATING AN ISOCHRONOUS CYCLIC COMMUNICATION SYSTEM

(75) Inventors: Dieter Brückner, Unterleiterbach (DE); Franz-Josef Götz, Heideck (DE); Dieter Klotz, Fürth (DE); Jürgen Schimmer, Nürnberg (DE)

(73) Assignee: Siemens Aktiengesellschaft, Munich (DE)

( * ) Notice: Subject to any disclaimer, the term of this patent is extended or adjusted under 35 U.S.C. 154(b) by 841 days.

(21) Appl. No.: 10/490,424

(22) PCT Filed: Sep. 13, 2002

(86) PCT No.: PCT/DE02/03438

§ 371 (c)(1),
(2), (4) Date: Mar. 23, 2004

(87) PCT Pub. No.: WO03/028320

PCT Pub. Date: Apr. 3, 2003

(65) Prior Publication Data
US 2004/0258015 A1    Dec. 23, 2004

(30) Foreign Application Priority Data
Sep. 26, 2001  (DE) ............... 101 47 424
Jun. 27, 2002  (DE) ............... 102 28 823

(51) Int. Cl.
H04B 7/212    (2006.01)
H04L 12/43    (2006.01)

(52) U.S. Cl. ..................... 370/442; 370/458

(58) Field of Classification Search ........... 370/442, 370/451–452, 458, 460
See application file for complete search history.

(56) References Cited

U.S. PATENT DOCUMENTS

| 5,594,734 | A | 1/1997 | Worsley et al. |
| 6,266,702 | B1 * | 7/2001 | Darnell et al. ............ 709/236 |
| 6,483,846 | B1 * | 11/2002 | Huang et al. ............ 370/445 |
| 6,687,264 | B1 * | 2/2004 | Yoon et al. ............ 370/490 |
| 2002/0064157 | A1 * | 5/2002 | Krause ............ 370/393 |

FOREIGN PATENT DOCUMENTS

| DE | 100 58 524 A1 | 6/2002 |
| WO | WO 98/28875 | 7/1998 |
| WO | WO 01/47162 A1 | 6/2001 |

* cited by examiner

Primary Examiner—Chau T. Nguyen
Assistant Examiner—Marcus R Smith

(57) ABSTRACT

The invention relates to a method for operating an isochronous, cyclic communication system, wherein one communication cycle can be subdivided into a first part for real-time communication and a second part for non-real-time communication. The communication system comprises subscribers and a memory is provided to store configuration data in each subscriber. The inventive method comprises the following steps: the communication system is operated with first configuration data for real-time communication; second configuration data is transmitted for real-time communication in a second part of one or several communication cycles; the second configuration data is stored in the memories of the subscribers; a transfer time indicating the moment in time when transfer occurs from the first configuration data to the second configuration data.

5 Claims, 3 Drawing Sheets

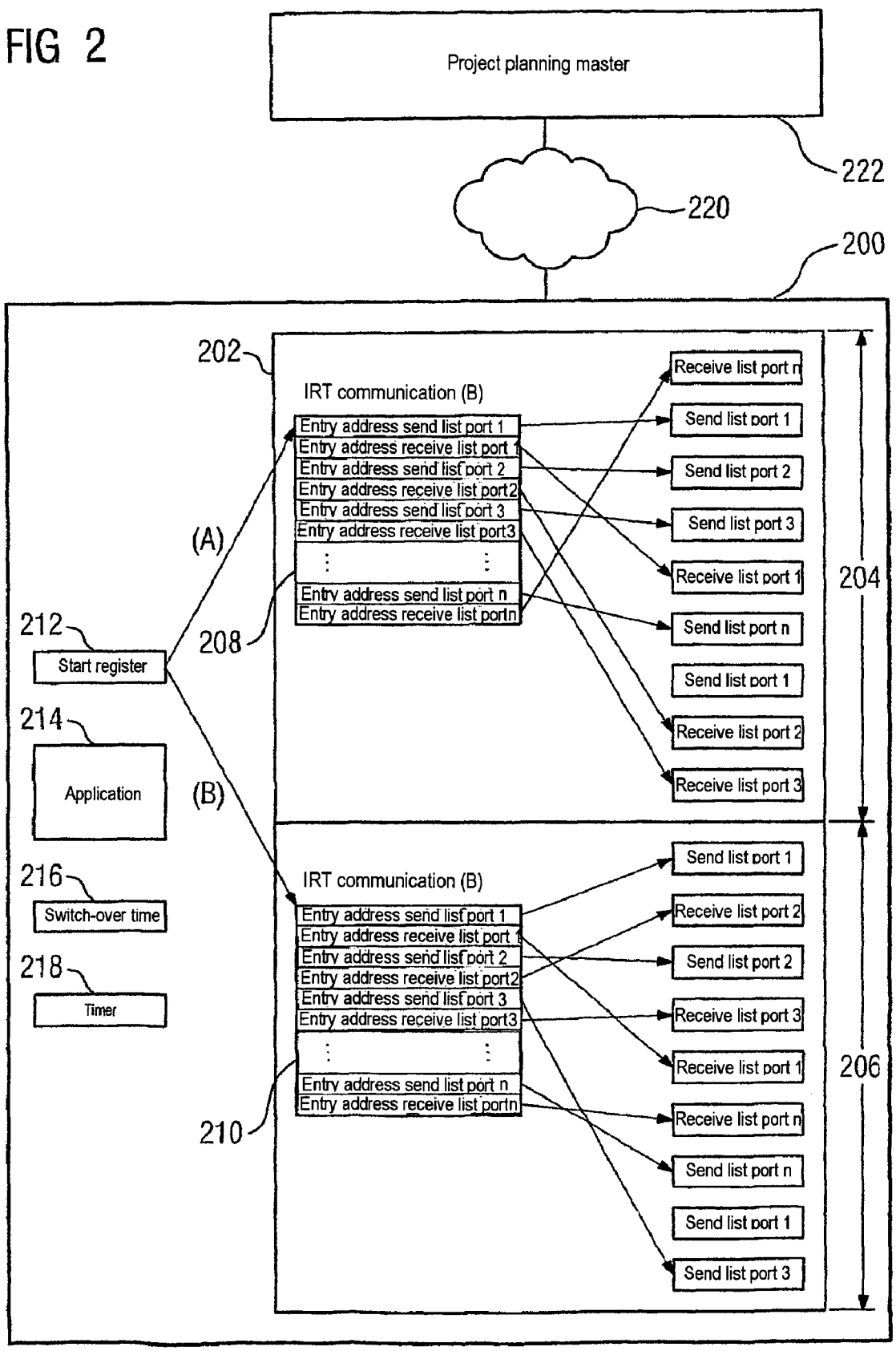

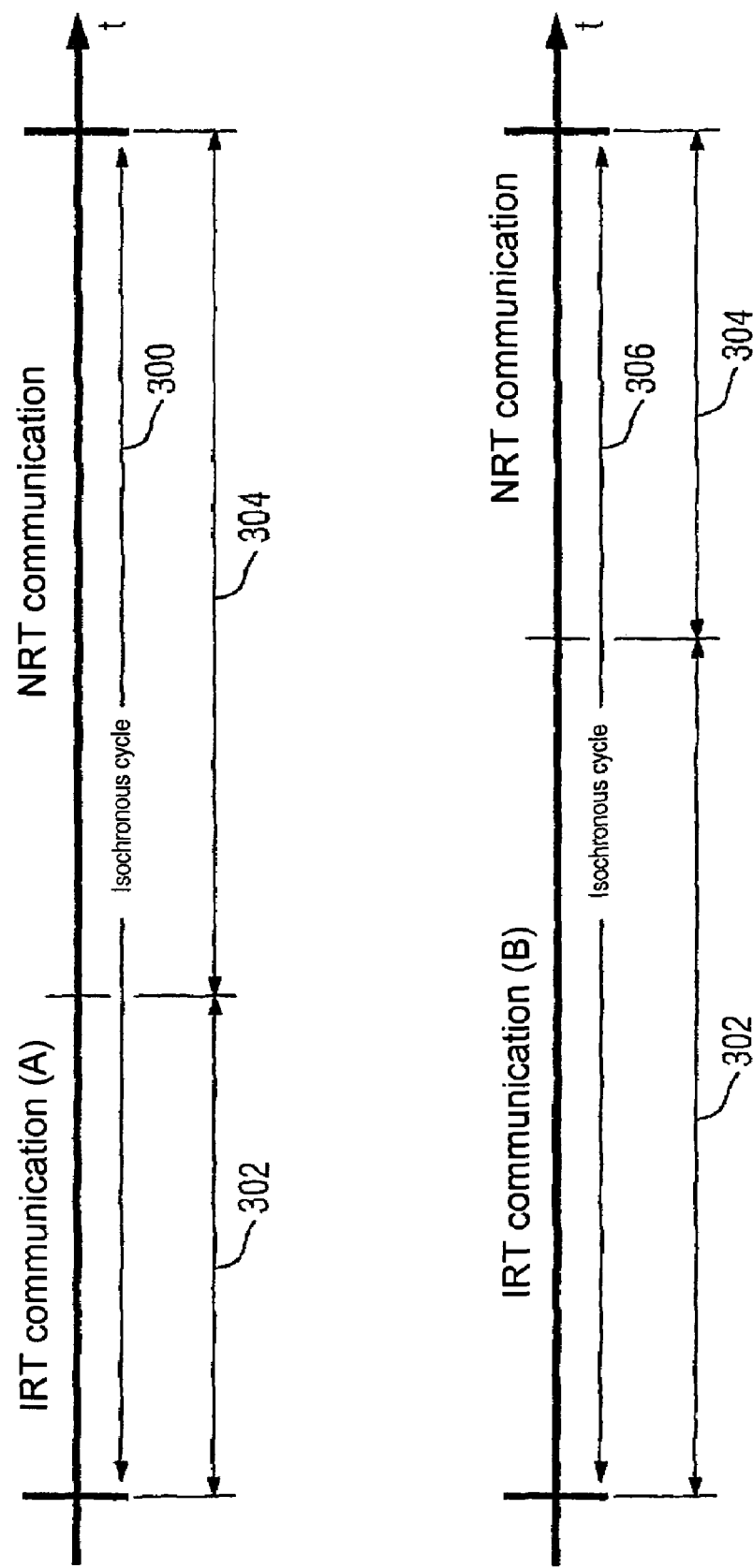

METHOD FOR OPERATING AN ISOCHRONOUS CYCLIC COMMUNICATION SYSTEM

CROSS REFERENCE TO RELATED APPLICATIONS

This application is the US National Stage of International Application No. PCT/DE02/03438, filed Sep. 13, 2002 and claims the benefit thereof. The International Application claims the benefits of German application No. 10147424.5 DE filed Sep. 26, 2001, and German application No. 10228823.2 DE filed Jun. 27, 2002, all of the applications are incorporated by reference herein in their entirety.

FIELD OF INVENTION

The invention relates to a method for operating an isochronous, cyclical communication system, a digital storage medium with the corresponding program means, a subscriber at such a communication system and a communication system.

BACKGROUND OF INVENTION

An asynchronous, clocked communication system with equidistant characteristics is taken to mean a system a system with the least two subscribers who are connected via a data network for the purposes of mutual exchange of data or mutual transmission of data. In this case data is exchanged cyclically in equidistant communication cycles which are specified by the communication clock used by the system. Subscribers are for example central automation devices, programming, project planning or operating devices, peripheral devices such as input/output modules, drives, actors, sensors, Programmable Logic Controllers (PLC) or other control units, computers or machines which exchange electronic data with other machines and process data, especially from other machines. Subscribers are also called network nodes or nodes. Control units in this document are taken to mean closed-loop controllers or control units of all types, but also switches and/or switch controllers for example. Typical examples of data networks used are bus systems such as Field Bus, Profibus, Ethernet, Industrial Ethernet, FireWire or also PC-internal bus systems (PCI), etc., but especially also the isochronous Realtime Ethernet.

Data networks allow communication between a number of subscribers by networking, that is connecting the individual subscribers to each other. Communication here means the transmission of data between the subscribers. The data to be transmitted is sent in this case as data telegrams, i.e. the data is packed into a number of packets and sent in this form over the data network to the corresponding recipient. The term data packet is thus used. The term transmission of data is used in this document fully synonymously with the above-mentioned transmission of data telegrams or data packets.

In distributed automation systems, for example in the area of drive technology, specific data must arrive at specific times at the intended subscribers and must be processed by the recipients. This is referred to as realtime-critical data or data traffic since if the data does not arrive at its intended destination at the right time this can produce undesired results at the subscriber by contrast with non-realtime critical, for example Internet or Intranet based data communication.

Realtime Ethernet communication is a planned, cyclic communication. Thus a list for the realtime telegrams to be sent (IRT telegrams) as well as a list for the IRT telegrams to be received is assigned to each realtime port. The list elements each correspond to an IRT telegram. Each list element additionally contains the information about the time at which the corresponding assigned IRT telegram must be received or is to be transmitted within the isochronous cycle (communication cycle). In an isochronous cycle the send and receive lists of all realtime-capable Ethernet ports are processed and IRT communication is thus executed in the realtime-capable Ethernet network. IRT communication must however be planned in the initialization phase and cannot change during IRT operation. This leads to an inflexible IRT communication which does not allow dynamic behavior.

Operation of subnetworks in particular without knowing the subsequent final project planning of the overall network proves to be difficult in practice. Previously, each time they have been expanded, such systems have had to be switched off, reinitialized and started up again. If the subsequent overall system is already known, smooth expansion has only been possible thus far by planning in the later IRT communication of the overall network and executing it in cyclical operation when implementing the subnetwork. A retroactive change not known about beforehand however again leads to the problems already described and to their effects. The conversion of the IRT communication of the overall network because of changed peripheral conditions of the system or the production has also been undertaken previously by switching off, reinitialization and starting up the entire IRT communication of the system again.

A equidistant, deterministic, cyclic exchange of data in communication systems is based on a common clock or time basis of all components involved in communication. The clock or time basis is transmitted by a special component (clock pulse generator) to the other components. With the isochronous realtime Ethernet the clock or time basis is pre-specified by a synchronization master which sends synchronization telegrams.

Communication with realtime-capable Ethernet components is divided up into cyclical, planned IRT communication and non-cyclical and non-planned NRT (Non Realtime) communication. NRT communication corresponds in this case to the current normal and general Ethernet traffic known as Ethernet communication. The cyclical realtime communication as well as the non-cyclical non-realtime communication is executed in each isochronous cycle (communication cycle). The IRT send and IRT receive lists for realtime communication are stored in a communication memory.

A system and a method for transmission of data over switchable data networks, especially the Ethernet, is published in German Patent Application DE 100 58 524.8, which allows mixed operation of realtime-critical and non-realtime-critical, especially Internet or Intranet-based, data communication.

SUMMARY OF INVENTION

The object of the invention is to create an improved method for making realtime communication in an isochronous, cyclical communication system more flexible. Further objects of the invention are to create a corresponding digital storage medium, a subscriber to such a communication system and a corresponding communication system.

The object underlying the invention is achieved in each case with the features of the Independent patent claims. Preferred embodiments of the invention are specified in the dependent patent claims.

The invention enables the project planning data which form the basis for the planned realtime communication in the isochronous cyclical communication system to be changed during operation. For this purpose the changed project planning data is transmitted to the subscribers of the communication system in the unplanned NRT part of one or more communication cycles and stored there. Furthermore the switchover point to the changed project planning data is communicated to the subscribers. When the switchover point is reached the change project planning data is accessed at the subscribers as a basis for the planned IRT communication.

The advantage of this procedure is that a dynamic change to the project planning data of IRT communication can be achieved without interrupting the data telegram traffic in the communication system. Preferably the option of NRT communication over the communication system at any time is also retained. In accordance with a preferred embodiment of the invention the time component in a communications cycle which is freely available for NRT communication is adapted to the transmission of the project planning data, meaning that the NRT component is increased for short time to create sufficient transmission capacity for transmission of the project planning data.

In accordance with a preferred embodiment of the invention the switchover point to be changed project planning data is transmitted in a broadcast telegram to the subscribers of the communication system.

In accordance with a further preferred embodiment of the invention the project planning data includes send and receive lists for each port of a subscriber. In this case the send list of a port specifies the data telegram to be sent in the IRT part of an isochronous cycle and the point in time at which it is sent. The data telegram in this case is preferably specified using its identification. Accordingly a receiver list contains the data telegrams to be received at specific points in time within the IRT part of an isochronous cycle which are identified by their identifiers.

In accordance with a preferred embodiment of the invention a change to the project planning data is communicated to the subscribers by transmitting the updated send and receive lists to the subscribers in the NRT part of one or more communication cycles. In this case it is sufficient when each subscriber receives or stores only the send and receive lists relating to their ports.

In accordance with a preferred embodiment of the invention the original send and receive lists and the changed send and receive lists are stored in different address areas of a communication memory of a subscriber.

In accordance with a further preferred embodiment of the invention a subscriber features a start register to store a branch address in the address area of the communication memory which contains the current project planning data, meaning for example send and receive lists. To switch over to the changed project planning data the start register is overwritten by an application program of the subscriber with a new entry address pointing to the memory area in which the changed project planning data is located.

In accordance with a further preferred embodiment of the invention the changed project planning data and the switchover point are fed into the communication system by a project planning master.

In accordance with a further preferred embodiment of the invention the IRT send and IRT receive lists for realtime communication are stored in a communication memory of a subscriber.

The beginning of the lists (entry address to the beginning of the list structures in the communication memory) is also stored in a memory area of the communication memory. The entry address to this memory area is stored in its turn in a start register.

At the beginning of each isochronous cycle the corresponding Ethernet port uses the register content to branch to the address area which in its turn stores the addresses for the beginning of the lists in communication memory. Depending on the port number set in the parameters, different send and receive lists are selected for each port and processed during the isochronous cycle. For incomplete switchover of the IRT communication new project planning data and thereby new data for the planned IRT send and IRT receive lists can now be sent via the NRT data traffic by the project planning master and stored at the recipients by applications running there in non-used memory areas in communication memory. Previous IRT communication remains entirely unaffected by this.

A broadcast telegram (to all subscribers of the Ethernet network) is subsequently used by the project planning master to notify them of the isochronous cycle in which are the new IRT communication is to become effective. The applications running on the subscribers receive this data as well as the data which was provided for the new IRT send and IRT receive lists.

Since a synchronous isochronous cycle extending across all subscribers is required for cyclical data traffic, the applications of each subscriber, on reaching the point in time and thereby at the same point in time, will load the start register with the new entry address of the communication memory at which the new send and receive lists of the Ethernet port have been stored. In the subsequent isochronous cycle when the start register is read the Ethernet ports are now provided with other IRT send and IRT receive lists. The switchover of the list structures (including redundant lists) has thus occurred smoothly in the next isochronous cycle.

BRIEF DESCRIPTION OF THE DRAWINGS

Preferred embodiments of the invention are shown in more detail below with reference to the diagrams. The drawings show.

DETAILED DESCRIPTION OF INVENTION

Figure 1:
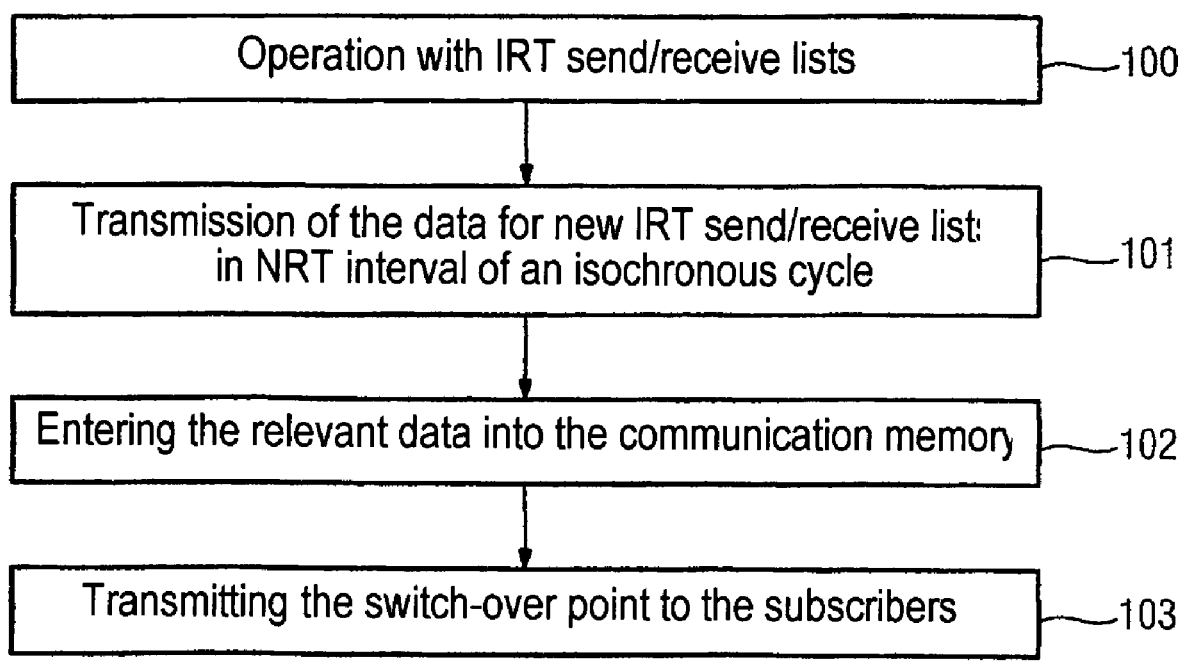
FIG. 1 a flowchart of a preferred embodiment of the method in accordance with the invention for updating project planning data, FIG. 2 a block diagram of a subscriber of an isochronous, cyclical communication system, FIG. 3 a communication cycle during the transmission of changed project planning data and after the transmission of the changed project planning data.

FIG. 1 shows a flowchart relating to the changing of project planning data in an isochronous, cyclical communication system of the type known from DE 100 58 524.8 for example.

In step 100 the communication system is operated with project planning data which contains send and receive lists for IRT communication for each port of the subscribers of the communication system. The send and receive lists relating to one subscriber or its ports are stored in this case in the communication memory of the subscriber.

In step 101 changed project planning data is transmitted to the subscribers of the communication system. The changed project planning data is transmitted here in the NRT part of one or more communication cycles. This is possible since the NRT part of the communication cycle involves a logical transmission channel available for unplanned communication. In the exemplary embodiment considered here all IRT send and receive lists are newly transmitted to the subscribers. This can be done for example by means of the NRT data telegrams directed to the subscribers concerned, each containing the new send and receive lists for the subscriber involved.

In step 102 the changed project planning data is entered into the communication memory of the subscribers. This can be done so that the new send and receive lists are stored in the communication memory of a subscriber without initially overwriting the previous send and receive lists. This ensures that ongoing operation of the communication system is not affected by the receipt and storage of the changed send and receive lists.

In step 103 the switchover point for switching over from the previous send and receive lists to the new send and receive lists, meaning that changed project planning data, is communicated to the subscribers. This switchover point is stored by each subscriber and compared to the local time of the subscriber. As soon as the switchover point has been reached, the new send and receive lists which are stored in the communication memory of this subscriber are used for further operation of IRT communication.

FIG. 2 shows a corresponding block diagram of a subscriber. Subscriber 200 has a number of ports 1 to n over each of which data telegrams can be sent and received.

Subscriber 200 also has a communication memory 202 for storing project planning data. A first set of project planning data is stored in address area 204. Communication memory 202 is large enough to enable a second set of project planning data to be stored in an address area 206.

In the embodiment considered here only that project planning data is stored in the communication memory 202 of subscriber 200 which actually relates to this subscriber, which means the send and receive lists for the ports 1 to n of the subscriber The project planning data is structured in such a way that it contains send and receive lists for each of the ports 1 to n. These lists form the basis for the planned IRT communication. The send lists specify the data telegrams to be sent at specific points in time via the ports concerned while the receive lists specify the data telegrams to be received at specific points in time in relation to specific ports of subscriber 200. Both the send lists and also the receive lists are completely processed once during an isochronous cycle.

The starts of the send and receive lists, which means the relevant receive addresses at the beginning of the list structures, are stored in a list 208 or 210.

In a start register 212 of subscriber 200 the entry address A or B into address area 204 or 206 of communication memory 202 is stored which is currently to be used for IRT communication.

Furthermore Subscriber 200 includes an application program 214. The application program 214 is used for storing new project planning data received by subscriber 200 in communication memory 202 and for storing the received switchover point in register 216. Application 214 compares the switchover point stored in register 216 with a timer 218. The timer 218 delivers the isochronous time reference for subscriber 200.

If the value of the timer 218 reaches the switchover point the application 214 overwrites the start register with the entry address B. This deactivates the set of project planning data stored in address area 204 and activates the set of project data stored in address area 206, meaning that the send and receive lists contained in the set of project data in address area 206 will be used as the basis for the planned IRT communication from and to subscriber 200.

Subscriber 200 is a part of the isochronous, cyclical communication system 220 in which one or more subscribers of the subscriber type 200 are located. A project planning master 222 is further linked to communication system 220, and the change project planning data and associated switchover points into the communication system can be fed in via this unit.

The NRT part of one or more communication cycles is used for transmitting the project planning data here. The length of the NRT part can be adapted in this case if the demands of IRT communication allow this.

This is illustrated in FIG. 3. FIG. 3 shows a transmission cycle of the isochronous, cyclical communication system, that is an isochronous cycle 300.

The isochronous cycle 300 is subdivided into a subcycle 302 for IRT communication and a subcycle 304 for NRT communication. The isochronous cycle 300 relates to a state of the communication system in which the subscriber 200 (cf. FIG. 2) works with the project planning data in address area 204, that is with the branch address A in start register 212.

While this is the case changed project planning data is transmitted from the project planning master 222 to the subscriber 200 and the further subscribers of the communication system 220 in the subcycle 304 of the isochronous cycle 300. To do this the share of subcycle 304 in isochronous cycle 300 is increased for a short time to create a higher transmission capacity. This is accompanied by a corresponding reduction in the length of subcycle 302. Such a reduction in the length of subcycle 302 is however only possible if the demands of realtime communication allow it, that is only where full processing of the send and receive lists is possible in the reduced subcycle 302.

After the changed project planning data has been transmitted the system returns to its normal state which has been reached in isochronous cycle 306. In isochronous cycle 306 the transmission of the changed project data has been completed; the application 214 (cf. FIG. 2) can then overwrite the start register 212 with the entry address B at the switchover point so that the changed project data becomes effective.

Accordingly the sub-division of the isochronous cycle 306 into subcycles for IRT communication and NRT communication is adapted to the lower requirements for transmission capacity in the NRT part of communication, meaning that subcycle 302 is extended and subcycle 304 shortened.

Alternatively the length of the NRT subcycle 304 is only determined by the length of IRT subcycle 302. The length of subcycle 304 is then produced by the difference between the length of isochronous cycle 306 and subcycle 302. The length of subcycle 302 in its turn is determined by the time required for processing by the send and receive lists within an isochronous cycle.

Since the extent of the send and receive lists can be changed, the length of subcycle 302 is also variable and thereby the remaining residual length for subcycle 304 as well. If for example a switch is made by the project planning data from entry address A to entry address B subcycle 302 is lengthened, as shown in FIG. 3, since the send and receive lists of the new project planning data in this example are more extensive than the original lists.

The invention claimed is:

1. A method for operating an isochronous cyclical communication system, comprising:

operating the communication system according to first project planning data for controlling isochronous realtime communication, wherein isochronous communications occurs during an isochronous realtime part of the communications cycle as set forth in the first project planning data and non-realtime communications occurs during a non-realtime part of the communications cycle;

transmitting second project planning data during the non-realtime part of the communication cycle wherein isochronous communications occur during an isochronous realtime part of the communications cycle as set forth in the second project planning data and non-realtime communications occurs during a non-realtime part of the communications cycle;

storing the second project planning data in a memory of a subscriber;

transmitting a switchover point to the subscribers, the switchover point specifying a time at which a switchover from the first project planning data to the second project planning data is to occur;

switching all subscribers at a same time from the first project planning data to the second project planning data when the switchover point occurs;

assigning send and receive lists to a port for each of the subscribers, the first and the second project planning data containing the assignments;

specifying data telegrams to be sent at a specific time in the send list;

specifying data telegrams to be received at a specific time in the receive list; and storing in the memory of each of the subscribers a portion of the first and the second project planning data that contains the send and receive lists for the subscriber.

2. The method in accordance with claim 1, wherein a start register is located in the subscriber, the start register having an entry address into the first and the second project planning data stored in the memory, the value of the start register being overwritten at the switchover point.

3. The method in accordance with claim 1, wherein the communication system has a communication cycle divisible into a first part for realtime communication and a second part for non-realtime communication, the communication system having a memory adapted to store the first and the second project planning data containing basic data for realizing realtime communication.

4. A subscriber for an isochronous cyclical communication system divisible into a first part for realtime communication and a second part for non-realtime communication, comprising:

a memory for storing the first and second project planning data for realtime communication, the project planning data containing data for realizing realtime communication, wherein the first and the second project planning data are send and receive lists, the send list specifying data telegrams to be sent at specific times and the receive list specifying data telegrams to be received at specific times.

means for receiving the second project planning data in a second part of a communication cycle;

means for storing the second project planning data in the memory;

means for receiving a switchover point for switching over from the first to the second project planning data; and means for switching over the subscriber at a same point as other subscribers from the first to the second project planning data upon reaching the switchover point.

5. The subscriber in accordance with claim 4, further comprising a start register for storing an entry address to the first or second project planning data, adapted to overwrite a start register for switching over from the first to the second project planning data at the switchover point.

* * * * *